Oct. 31, 1933.        W. C. HYDE         1,932,464
LANTERN SLIDE HOLDER
Filed Dec. 9, 1932
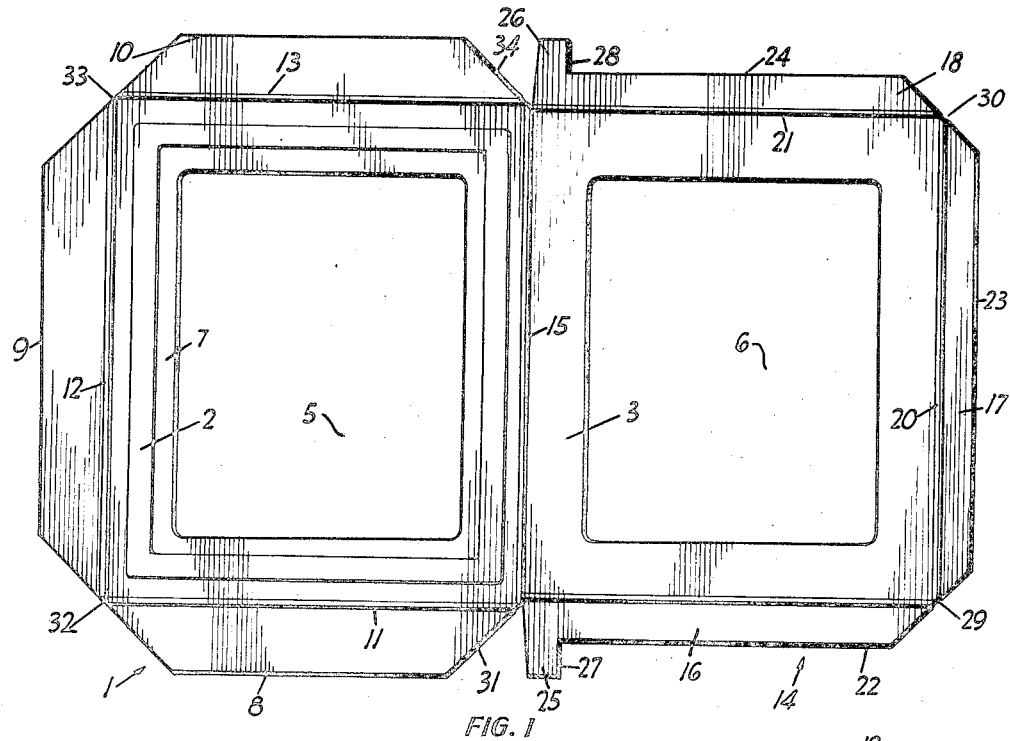
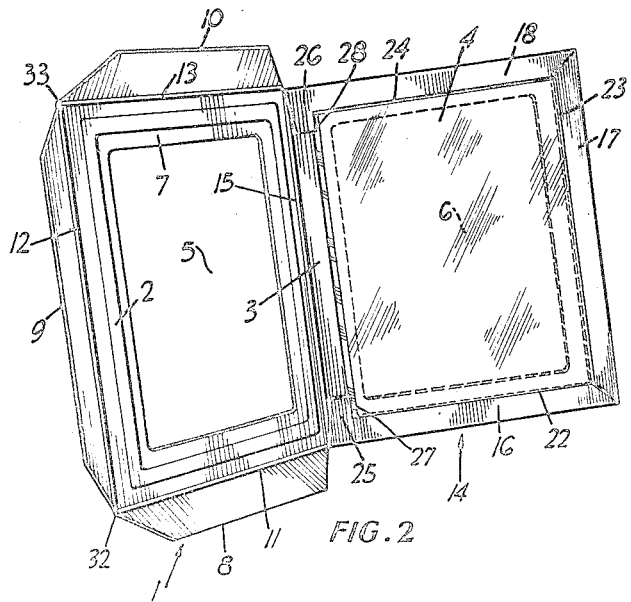
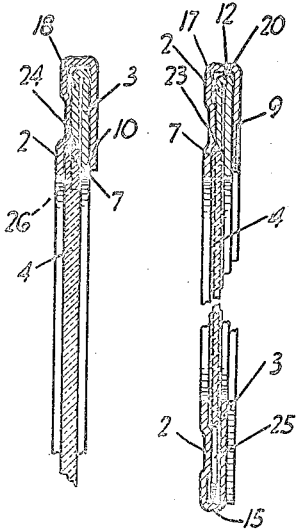
INVENTOR
WILLIAM C. HYDE
BY
ATTORNEY Patented Oct. 31, 1933

1,932,464

UNITED STATES PATENT OFFICE 1,932,464

LANTERN SLIDE HOLDER

William C. Hyde, Los Angeles, Calif., assignor to Consolidated Advertising Corp. Ltd., Los Angeles, Calif.

Application December 9, 1932. Serial No. 646,438

9 Claims. (Cl. 88—26)

This invention relates to slides adapted for use in projecting machines in which pictures, advertising matter, and the like are produced on suitable plates of transparent material and mounted within a retaining frame which, when assembled about the plate containing the picture element to be projected upon the screen, is of proper size for use in the machine.

My invention contemplates the use of a frame for the plate or transparency, which involves improvements on my former lantern slide holder, the application for letters patent of which is now pending under Serial Number 521,421.

An important object of this improvement resides in the incorporation of relatively narrow flaps which depend from adjacent sides of the front and back frames between which the plate is mounted, the flaps from the back frame, at least one of which is provided with a projecting piece, being adapted to be folded over and have the edges thereof abut the edges of the plate, thereby positioning the plate within the frame and adding stiffness thereto.

The flaps from the front frame are foldable over upon and securable to the rear face of the back frame, with the plate and the folded over flaps and projecting piece from the back frame resting therebetween.

The form of the invention which I have deemed most preferable for use is shown in the accompanying drawing, the brief description of which is as follows:

Fig. 1 is an outstretched plan view of the inner surface of the blank or envelop for enclosing the plate or transparent element.

Fig. 2 is a perspective view embodying the principles of my invention and looking toward the inner side of the extended blank, with the flaps of the back frame of the blank folded over and having their edges abutting the edges of a plate resting on that frame of the blank; and the front frame of the blank being shown with its flaps extended in readiness to be folded over and adhered to the rear face of the back frame, when the latter frame and plate are folded into registry with the front frame.

Fig. 3 is an enlarged vertical mid-section through the upper part of the device in folded condition.

Fig. 4 is an enlarged fragmentary transverse section of the device in the folded position.

The invention comprises a blank 1, composed of any suitable sheet material, consisting of a front frame or wing 2 and a back frame or wing 3 for enclosing a transparent member 4.

The frame 2 is provided with an opening 5 and the frame 3 is provided with an opening 6 through which the slide picture is exposed, said openings being brought into registry when one frame is folded upon the other.

The front frame 2 is also provided with a relief 7, forming a seat for the plate 4.

Relatively narrow fold over-flaps 8, 9 and 10 depend from the frame 2 along the scored lines 11, 12 and 13 and the major flap or wing 14, forming the back frame 3, depends from the frame 2 along the scored line 15, which line also serves as the fold line or hinge line of the two frames.

The back frame 3 is also provided with relatively narrow flaps 16, 17 and 18 which depend from the frame along scored lines 19, 20 and 21. These flaps are adapted to be folded inwardly of the frame so that their edges 22, 23 and 24 will abut the edges of the plate.

Since the major flap or back frame 3 depends from the front frame 2 along the scored line 15, it is not feasible to have a relatively narrow flap depend from this edge of the back frame.

However, to compensate for a relatively narrow flap at that side of the back frame and to provide slide positioning means at that side for the plate, I extend a portion of the flaps 22 and 24 at that side so as to form projecting pieces 25 and 26, so that when they are folded inwardly with the flaps 22 and 24 as shown in Fig. 2, the edges 27 and 28 of the projecting pieces will abut the edge of the plate, thereby positioning the plate in proper relation with the opening 6. Said flaps 22, 23 and 24 also serve to rigidify the frame structure as a whole.

The flaps 22, 23 and 24 are mitered at 29 and 30, so that when the flaps are folded inwardly, the mitered edges of each flap will abut as shown in Fig. 2.

The flaps 8, 9 and 10 are also mitered at points 31, 32, 33 and 34. At points 32 and 33, so that the end edges 31 and 34 will carry the effect of a mitered edge at those corners of the frame when the respective flaps are adhered to the rear face of the back frame.

The inside faces of the flaps 16, 17 and 18, and the projecting pieces 25 and 26 may be suitably gummed whereby they may be united to the inside face of the back frame.

Likewise the inside faces of the flaps 8, 9 and 10 may be suitably gummed whereby when the two frames are folded together and the flaps 8, 9 and 10 overlap the back frame with the plate resting therebetween, the gummed surfaces may be adhered to the rear face of the back frame, thus holding the two frames in registry.

I claim:

1. The combination with the slide, of a slide holder comprising companion wing frames foldable together and provided with light projection areas, slide retaining flaps extending from the outer edges of each frame and along the edges thereof which are adjacent to said outer edge, and a projecting piece depending from one of said flaps.

2. The combination with a transparent member, of a foldable holder provided with light projection openings comprising a front frame and a back frame united together where they fold, flaps depending from sides of each of said frames, and projecting pieces depending from the flaps adjacent the line of folding of said frames.

3. A frame for a plate consisting of a single sheet of material comprising front and back members one of which is foldable over upon the other and each having an opening, which, when the members are folded one upon the other, are adapted to be brought into registry, relatively narrow flaps depending from sides of each of said members, and an extension on one of the flaps of said back member, the latter flaps and extension together with the remaining flaps of said back member being foldable inwardly so as to have their inwardly directed free edges abut the edges of said plate and the flaps of the front member being foldable over said back member and adhered to the back side thereof.

4. The combination with the slide, of a slide holder consisting of a one piece mat comprising a front frame, relatively narrow flaps depending from three sides of said front frame, a major flap forming a back frame depending from the remaining side of said front frame and relatively narrow flaps depending from three sides of said back frame, each of said frames being provided with an opening, the one registering with the other, when said frames are assembled in folded relation, the flaps of the back frame being foldable inwardly so as to have their inwardly directed free edges abut the edges of said slide and the flaps of the front frame being foldable over said back frame and adhered to the back side thereof.

5. The combination with the slide, of a slide holder consisting of a one piece mat comprising a front frame, relatively narrow flaps depending from three sides of said front frame, a major flap forming a back frame depending from the fourth side of said front frame, and relatively narrow flaps depending from three sides of said back frame, adapted to be folded inwardly whereby the inwardly directed edges abut three sides of said slide, and projecting pieces formed integrally with two of the inwardly directed flaps of the back frame having edges to abut the fourth edge of said slide, at least one of said frames having a sight opening therethrough, and the flaps of the front frame being foldable over the major flap and fastenable thereto.

6. The combination with the slide, of a slide holder comprising two frames consisting of a front frame and a back frame, cut from a single sheet, the one being foldable upon the other, said front frame being provided with an opening and a relief for positioning the slide relatively to said opening, said back frame being provided with an opening, and relatively narrow flaps depending from said back frame foldable inwardly of the frame whereby to position said slide relatively to said second opening and relatively narrow flaps depending from the sides of said front frame foldable over and fastenable to the rear face of the back frame with said slide resting between said frames.

7. The combination with a transparency, of a back frame having a marginal portion greater than the transparency and provided with a window opening smaller than the transparency, said back frame being provided with relatively narrow flaps hinged along three edges of substantially the same width as the marginal portion of the frame which extends beyond the edges of the transparency, said flaps being foldable over and securable to said marginal portion with the individually inwardly presented edges of said folded over flaps abutting three edges of said transparency, a front frame provided with folds and means to enfold said back frame and transparency between the frame and folds of the front frame.

8. A back wing of sheet material having a rectangular opening therethrough, said wing being an extension of a front wing formed from the same sheet of material and foldable with relation thereto, the margin of said opening being in spaced relation to the line of folding between said wings, said back wing having opposite flaps formed therein and foldable inwardly with relation thereto, said flaps having integrally formed extensions adjacent said line of folding and said front wing having flaps foldable over around the edges of the back wing when the two wings are in a folded relation to each other with said inwardly directed flaps resting therebetween.

9. As an article of manufacture a sheet of material comprising two companion wings foldable upon each other to house a plate, at least one of said wings having a sight opening therethrough to expose the plate to view, one of said wings having oppositely disposed flaps and an extension depending from each of said flaps formed in the sheet material thereof, said flaps together with their extensions being foldable inwardly with relation to the wing bringing said extension into a position to form a stop to space the plate away from the line of folding.

WILLIAM C. HYDE.